United States Patent
Grosser et al.

(10) Patent No.: US 10,505,679 B2
(45) Date of Patent: Dec. 10, 2019

(54) SYSTEMS AND METHODS FOR HARDWARE-IMPLEMENTED ANOMALY DETECTION IN VLAN NETWORK USING LOOPBACK PORT

(71) Applicant: Extreme Networks, Inc., San Jose, CA (US)

(72) Inventors: Donald Grosser, Apex, NC (US); Shankara Ramamurthy, Chennai (IN)

(73) Assignee: Extreme Networks, Inc., San Jose, CA (US)

( * ) Notice: Subject to any disclaimer, the term of this patent is extended or adjusted under 35 U.S.C. 154(b) by 108 days.

(21) Appl. No.: 15/894,687

(22) Filed: Feb. 12, 2018

(65) Prior Publication Data

US 2019/0253208 A1    Aug. 15, 2019

(51) Int. Cl.
*H04L 1/24* (2006.01)
*H04L 12/46* (2006.01)
*H04L 12/947* (2013.01)
*H04L 12/18* (2006.01)
*H04L 29/12* (2006.01)
*H04L 29/08* (2006.01)

(52) U.S. Cl.
CPC .............. *H04L 1/243* (2013.01); *H04L 12/18* (2013.01); *H04L 12/4641* (2013.01); *H04L 49/25* (2013.01); *H04L 61/6022* (2013.01); *H04L 69/324* (2013.01)

(58) Field of Classification Search
CPC ..... H04L 1/243; H04L 12/18; H04L 12/4641; H04L 49/25; H04L 61/6022; H04L 69/324

USPC .................................................. 370/241, 249
See application file for complete search history.

(56) References Cited

U.S. PATENT DOCUMENTS

| | | | |
|---|---|---|---|
| 2005/0259589 A1* | 11/2005 | Rozmovits | H04L 1/243 370/249 |
| 2007/0091890 A1* | 4/2007 | Radhakrishnan | H04L 12/18 370/390 |
| 2012/0236866 A1* | 9/2012 | Endo | H04L 43/0811 370/392 |
| 2017/0041209 A1* | 2/2017 | Joshi | H04L 45/64 |

\* cited by examiner

*Primary Examiner* — Obaidul Huq
(74) *Attorney, Agent, or Firm* — Sterne, Kessler, Goldstein & Fox P.L.L.C.

(57) ABSTRACT

Systems and methods are disclosed herein for determining that a diagnostic mode is enabled for a port of a switch, the port being part of a VLAN, and responsively designating a port of the plurality of ports as a loopback port, where a packet transmitted on the loopback port is forwarded according to an entry of a forwarding database. The disclosure further describes generating a layer 2 multicast index comprising an entry for the port and an entry for the loopback port, programming the forwarding database with an entry for a destination address of the switch pointing to the layer 2 multicast index, generating a diagnostic packet, and transmitting the diagnostic packet on the loopback port. Additionally, the disclosure describes determining that the diagnostic packet is received by any port of the plurality of ports, and responsively determining a network problem exists and causing a diagnostic protocol to be executed.

20 Claims, 6 Drawing Sheets

SYSTEMS AND METHODS FOR HARDWARE-IMPLEMENTED ANOMALY DETECTION IN VLAN NETWORK USING LOOPBACK PORT

BACKGROUND

When a switch transmits a Protocol Data Unit ("PDU") (interchangeably used herein with "packet") across a network, the PDU may be received at a port of the same switch that sent the PDU. In such a scenario, a network loop exists. Generally, network loops are unintended, and undesired, as they negatively impact network performance.

SUMMARY

In some aspects of the disclosure, control circuitry of a switch is configured to determine whether a diagnostic mode (e.g., a loop recovery protocol) is enabled for a given port of a plurality of ports of the switch, the given port being part of a virtual local area network (VLAN). In response to determining that the diagnostic mode is enabled for the given port, the control circuitry may designate a different port of the plurality of ports as a loopback port, where a packet transmitted on the loopback port is forwarded according to an entry of a forwarding database.

Additionally, the control circuitry may generate a layer 2 multicast index (e.g., a table of layer 2 multicast address destinations) comprising an entry for the given port and an entry for the loopback port, and may program the forwarding database (e.g., in storage circuitry) with an entry for a destination address of the switch pointing to the layer 2 multicast index. The control circuitry may go on to generate a diagnostic packet (described below) and transmit the diagnostic packet on the loopback port.

The control circuitry may be further configured, when generating the diagnostic packet, to program a source media access control (MAC) address of the diagnostic packet to be a MAC address of the switch, and to program a destination MAC address of the diagnostic packet to be the MAC address of the switch with a multicast bit set. The control circuitry is further configured to program the diagnostic packet to include a VLAN tag indicative of the VLAN.

The control circuitry may determine whether the diagnostic packet is received by any port of the plurality of ports. For example, the control circuitry, when determining whether the diagnostic packet is received by any port of the plurality of ports, may determine whether an incoming diagnostic packet is received at any port of the plurality of ports other than the loopback port. In other words, after the diagnostic packet is sent out to the network, if a loop exists in the network, the diagnostic packet will be received at a port of the switch after passing through the network loop. In response to determining that the incoming diagnostic packet is received at a port of the plurality of ports other than the loopback port, in order to identify the incoming packet as a diagnostic packet, the control circuitry may determine whether a destination address of the incoming diagnostic packet matches an address of the switch with the multicast bit set. In response to determining that the destination address of the incoming diagnostic packet matches the address of the switch with the multicast bit set, the control circuitry may determine that the diagnostic packet is received by any port of the plurality of ports. In response to determining that the diagnostic packet is received by a port of the switch, the control circuitry may cause a diagnostic protocol to execute.

In some embodiments, the control circuitry is further configured to regulate traffic flow for packets with a destination address set to be a media access control (MAC) address of the switch. The traffic flow may be regulated by way of a meter whose rate is set to a range of 100-300 packets per second.

The diagnostic mode may be specifically enabled on the given port for the VLAN, and the control circuitry may be further configured to determine whether the VLAN is the only VLAN for which the diagnostic mode is enabled on the given port. In response to determining that the VLAN is the only VLAN for which the diagnostic mode is enabled on the given port, the control circuitry monitors packets transmitted by way of the given port to the VLAN to determine, for each such packet, whether a rule is matched. The rule may be as follows: a media access control (MAC) destination address is set to be a MAC address of the switch with a multicast bit set, and an outgoing port field is set to be an identifier for the given port. In response to determining that the rule is matched, the control circuitry may insert, into a packet that matches the rule, an inner VLAN tag comprising a unique identifier for the given port.

In some embodiments, the control circuitry is further configured, in response to transmitting the diagnostic packet on the loopback port, to, based on the entry of the forwarding database pointing to the layer 2 multicast index, replicate the diagnostic packet to both the given port and the loopback port, where the packet that matches the rule was replicated to the given port.

In some embodiments, the control circuitry is further configured to determine whether the diagnostic mode is enabled on a port additional to the given port on the VLAN. In response to determining that the diagnostic mode is enabled on the port additional to the given port on the VLAN, the control circuitry adds the port additional to the given port to the layer 2 multicast index.

The control circuitry may be further configured to determine whether the diagnostic mode has been disabled on all ports of the plurality of ports that are in the VLAN. In response to determining that the diagnostic mode has been disabled on all ports of the plurality of ports that are in the VLAN, the control circuitry deletes the layer 2 multicast index. The control circuitry may be configured, upon receiving the diagnostic packet that was forwarded by the network processing unit, to determine that a loop exists in the VLAN, and to disable the loop by way of execution of a loop recovery action.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems, methods, and apparatuses are disclosed herein for using software and hardware capabilities of a switch to perform network diagnostics, such as diagnosing a loop in a VLAN. In some embodiments of the disclosure, loop detection mechanisms are implemented by one or more modules operating in control circuitry, which may transmit a diagnostic PDU across virtual local area network ("VLAN") ports, and may instruct a component of the switch to forward the diagnostic PDU back to the CPU if the diagnostic PDU is received by the switch (due to a loop existing in the network). This embodiment enables control circuitry to detect loops in a network at a speed at which a processing unit of the control circuitry is able to generate diagnostic packets and detect looped back diagnostic packets—typically on the order of once per second. This embodiment is able to scale on the order of tens of VLANs and ports.

In other embodiments of the disclosure, as will be described below with reference to FIGS. 1 and 2, network loops may be detected at a speed faster than that which a processing unit of control circuitry is able to generate diagnostic packets. This is achieved, among other things, by use of a loopback port implemented on a switch, which substantially reduces packet transmission intervals, resulting in a low amount of time to perform anomaly detection. Moreover, in those other embodiments, scaling of VLANs and ports may be improved by several orders of magnitude as compared to the embodiment described immediately above.

Figure 1:
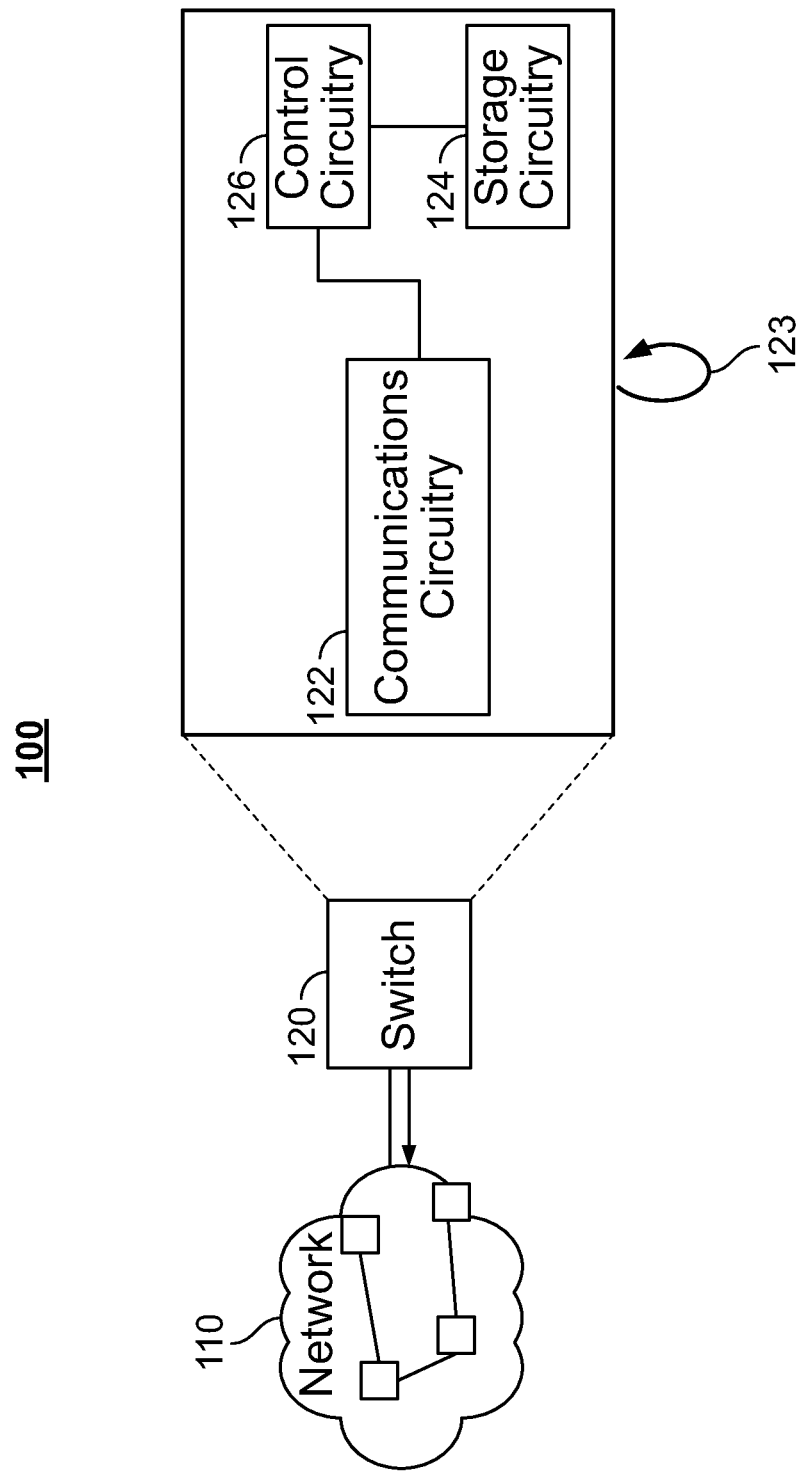
FIG. 1 depicts an illustrative system including a switch enabled to detect network anomalies by way of a hardware implementation, in accordance with some embodiments of the disclosure.

FIG. 1 depicts an illustrative system including a switch enabled to detect network anomalies by way of implementation of a loopback port, in accordance with some embodiments of the disclosure. System 100 includes network 110 and switch 120. Network 110 may be a VLAN to which switch 120 belongs, or may be any other network. Switch 120 includes illustrative components, such as communications circuitry 122, storage circuitry 124, and control circuitry 126. These components may be implemented by any switch, such as switch 110 and other switches 130. Communications circuitry 122 may be any known receiver, transmitter, transceiver, or any other known means of transmitting and/or receiving data. Storage circuitry 124 may be any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc. Control circuitry 126 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 126 executes instructions stored in memory (i.e., storage circuitry 124). Communications circuitry 122 includes a plurality of ports, including loopback port 123, which will be described in further detail below.

When a diagnostic protocol (e.g., a loop detection protocol) is enabled on a first member port of a VLAN on switch 120, control circuitry 126 selects a loopback port (e.g., loopback port 123) for transmission of a diagnostic packet. As used herein, the term "diagnostic protocol" refers to any protocol for diagnosing an anomaly in a network. While a loop recovery diagnostic protocol is the main embodiment discussed in this disclosure, the hardware implementation described herein is equally applicable to other diagnostic protocols, such as operations, administration, and maintenance ("OAM") diagnostics. As will be described in further detail below, control circuitry 126 uses loopback port 123 of communications circuitry 122 to ensure the diagnostic packet is registered to a forwarding database entry, while also replicating a packet for transmission across network 110. In some embodiments, an egress filter rule may be added to the port, where if the MAC destination address of an outgoing packet matches the destination address of the switch with a multicast bit set, and if the outgoing port is the first member port on which diagnostics are enabled, then an inner VLAN tag that uniquely identifies the port is inserted into the packet. This egress filter rule is preferably applied where this VLAN is the first VLAN enabled for diagnostics on the first member port.

In some embodiments, the control circuitry selects a port of communications circuitry 122 to be loopback port 123 based on a user configuration designating a port of switch 120 (e.g., a front panel port) to be used as a loopback port. In other embodiments, the control circuitry may select loopback port 123 based on a default, existing internal loopback port in switch 120 being known to the control circuitry. As will be described in further detail below, in some embodiments, when loopback port 123 is selected, diagnostic checks are disabled on loopback port 123, as loopback port 123 necessarily will have a diagnostic packet looped back.

Figure 2:
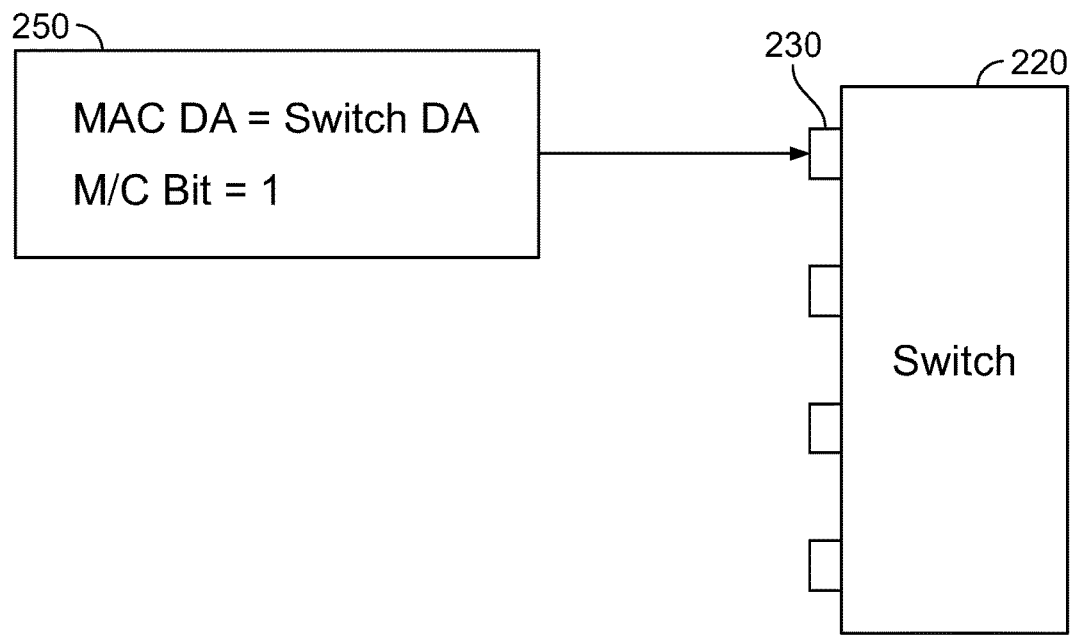
FIG. 2 depicts an illustrative diagnostic packet being received by a switch having a port in a diagnostic mode, in accordance with some embodiments of the disclosure.

FIG. 2 depicts an illustrative diagnostic packet being received by a switch having a port in a diagnostic mode, in accordance with some embodiments of the disclosure. FIG. 2 depicts switch 220, which has the same capabilities as described herein with respect to switch 120 of FIG. 1. Switch 220 includes port 230, which may be implemented by way of communications circuitry 122 as described above with respect to FIG. 1. Packet 250 includes a MAC destination address ("DA") and a multicast ("M/C") bit. As depicted in FIG. 2, the MAC DA is set to equal the DA of switch 120, and the M/C bit is set to 1.

While the diagnostic protocol is enabled on a given port of switch 120, heuristics are established for detecting an anomaly (e.g., stored in storage circuitry 124, and executed by control circuitry 126). In a loop detection protocol, for example, a rule may be established where a diagnostic packet is detected to have traversed a loop if a media access control (MAC) destination address (DA) of a received packet is equal to the MAC address of switch 120 (with a multicast bit set), and if the port that the packet is received through is a port of switch 120, or alternatively a front panel port of switch 120. Thus, if control circuitry 126 detects that a packet satisfying this rule is received (e.g., packet 250, as depicted in FIG. 2), then control circuitry 126 detects an anomaly. Generally, the ports that are compared to the port where the packet is received do not include loopback port 123, as inclusion may result in a false positive, given that loopback of a packet is intentional when transmitted through loopback port 123. When the rule is realized, action is taken to redirect the packet matching the rule to a processing unit of control circuitry 126, for execution of diagnostic processing.

Control circuitry 126 supports the diagnostic mode by creating a layer 2 multicast index at storage circuitry 124, and adding the port on which the diagnostic mode is running to the index, as well as adding loopback port 123 to the index. Furthermore, the control circuitry programs a forwarding database entry at storage circuitry 124 pointing to the layer 2 multicast index, where diagnostic packets received by loopback port 123, which have a destination address for the switch MAC address with the multicast bit set, will be forwarded to addresses in the layer 2 multicast index.

When setup for the diagnostic protocol is finished (i.e., a loopback port is selected, the layer 2 multicast index is generated, and the forwarding database entry is created), control circuitry 126 (e.g., by running the diagnostic agent), may generate a diagnostic PDU for network 110. The diagnostic PDU is set with a source MAC address being equal to the MAC address of switch 120. The destination MAC address of the diagnostic PDU is set with a destination MAC address equal to MAC address of switch 120, with the multicast bit set (e.g., as depicted for packet 250 of FIG. 2). Furthermore, if network 110 is a VLAN, then a VLAN tag of the VLAN on which the diagnostic protocol has been enabled may be inserted into the diagnostic PDU. This insertion may occur during initial packet generation, or optionally, this insertion may happen after the diagnostic PDU is transmitted to loopback port 123. In some embodiments, the PDU may additionally have, or omit, a source port encoding.

After a diagnostic PDU is generated, control circuitry 126 transmits the PDU on loopback port 123. The PDU will be replicated to both the port on which the diagnostic protocol was enabled, as well as to loopback port 123. This is because the destination address of the diagnostic PDU is set as the switch MAC address with the multicast bit. As described above, the forwarding database entry points, for any such packets, to the layer 2 multicast index, which has the diagnostic-enabled port and loopback port 123 listed within the index. Moreover, optionally, at this time, the VLAN tag of the VLAN on which the diagnostic protocol has been enabled may be inserted into the PDU subsequent to packet replication.

In some embodiments, control circuitry 126 may attach a meter for diagnostic traffic (i.e., traffic with a destination address of the switch MAC address with the multicast bit set). This meter may regulate the volume of traffic on loopback port 123. The meter rate may be set to, for example, one hundred packets per second for a ten millisecond diagnostic interval, or to three hundred packets per second if a three point three millisecond interval is desired. These examples are merely illustrative; any rate setting for the meter is within the scope of this disclosure.

Finally, the diagnostic PDU is transmitted from communications circuitry 122 to network 110. If switch 120 is part of a loop in network 110, then the diagnostic PDU will loop back to switch 120 (e.g., as has happened to packet 250 of FIG. 2), and control circuitry 126 will detect the diagnostic PDU at one of the ports of communications circuitry 122. Through the above-described mechanisms, the diagnostic PDU will be redirected to a CPU of control circuitry 126 for processing. In embodiments where the inner VLAN tag was inserted into the packet per the above-described rule, then the software additionally knows the port on which the packet was transmitted out, which may inform the loop recovery actions. In some embodiments, a loop recovery action may include issuing a log (e.g., by storing to local memory (e.g., storage 124) or to a remote database, and/or transmitting the log to a network administrator) documenting the detected loop. Loop recovery actions may additionally, or alternatively, include disabling either, or both, of the port that received the diagnostic PDU and the port that transmitted the diagnostic PDU, in an effort to disable the loop.

In some embodiments, when the diagnostic protocol is enabled on another port in the same VLAN (e.g., also on switch 120, or on another switch of the VLAN), then control circuitry 126 may add the new port to the layer 2 multicast index. Furthermore, if the diagnostic protocol is disabled on all member ports in the VLAN, then the forwarding database entry and the layer 2 multicast index may be deleted. In some embodiments, every VLAN that has the diagnostic protocol enabled has its own forwarding database entry and a layer 2 multicast index stored in storage circuitry 124.

Figure 3:
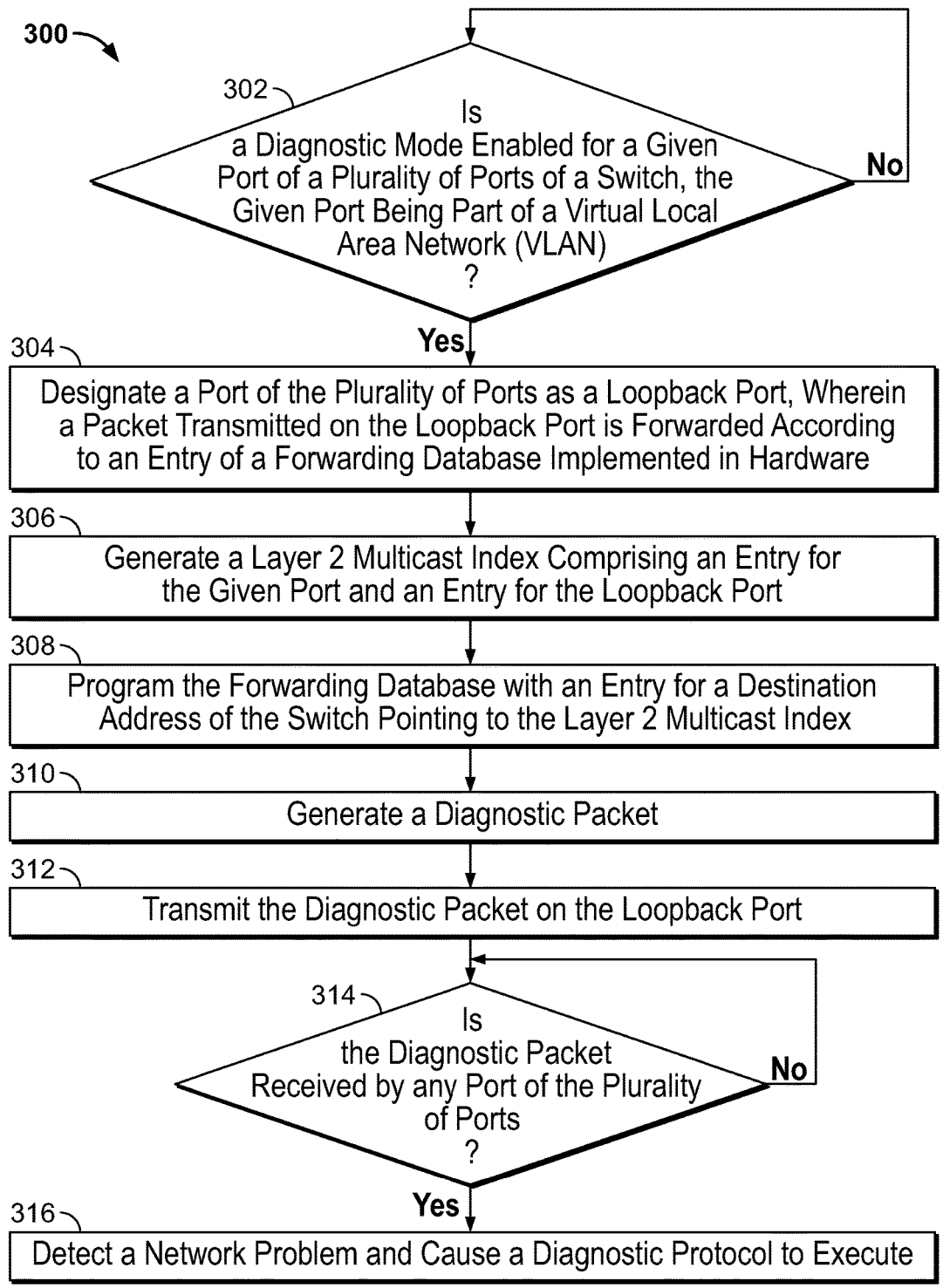
FIG. 3 depicts an illustrative flowchart of steps for enabling a switch to detect network anomalies by way of implementation of a loopback port, in accordance with some embodiments of the disclosure.

FIG. 3 depicts an illustrative flowchart of steps for enabling a switch to detect network anomalies by way of implementation of a loopback port, in accordance with some embodiments of the disclosure. For brevity elements of process 300 that were described in detail with respect to FIG. 1 and FIG. 2 will not be repeated in the description of FIG. 3, but those above-described elements are intended to carry into their respective description of FIG. 3 below.

Process 300 begins at 302, where control circuitry (e.g., control circuitry 126 of switch 120) determines whether a diagnostic mode (e.g., loop recovery protocol) is enabled for a given port of a plurality of ports (e.g., of communications circuitry 122) of a switch (e.g., switch 120), the given port being part of a virtual local area network (VLAN). For example, the control circuitry may detect input from a user to enable diagnostic mode on the given port, and thus may determine that the diagnostic mode is enabled for that port. 302 continues until a determination is made in the affirmative; when a determination is made in the affirmative, process 300 continues to 304. At 204, the control circuitry designates a port of the plurality of ports as a loopback port (e.g., loopback port 123), where a packet transmitted on the loopback port is forwarded according to an entry of a forwarding database implemented in hardware. For example, the control circuitry may set, in a register indicating roles of each port, a bit flag in a field that stores a binary value as to whether a given port has a role of being a loopback port.

At 306, the control circuitry generates a layer 2 multicast index (e.g., stored at storage circuitry 124) comprising an entry for the given port and an entry for the loopback port (e.g., loopback port 123). For example, the control circuitry may store to memory (e.g., storage circuitry 124) an index indicating an address of the given port and also indicating an address of the loopback port. When a multicast packet forwarding decision requires referencing the layer 2 multicast index, the multicast packet will thus be forwarded to the given port and to the loopback port. At 308, the control circuitry programs the forwarding database with an entry for a destination address of the switch pointing to the layer 2 multicast index (e.g., at storage circuitry 124). For example, the control circuitry stores an entry within the forwarding database that indicates a rule, the rule stating that when a diagnostic packet is received with a destination address header indicating an address of the switch (e.g., switch 120), the packet will be forwarded according to the layer 2 multicast index. At 310, the control circuitry generates a diagnostic packet. For example, the control circuitry may generate a packet with a destination address of switch 110 (e.g., with the multicast bit set), and optionally, with a payload indicating that the packet is a diagnostic packet. The packet may be held in an output buffer. At 312, the control circuitry transmits the diagnostic packet on the loopback port (e.g., loopback port 123). For example, the control circuitry may cause the packet to be transmitted from the output buffer to the loopback port, which in turn, based on the forwarding database pointing to the layer 2 multicast index, causes the packet to be replicated to the loopback port (e.g., loopback port 123) and to be output to network 110.

At 314, the control circuitry determines whether the diagnostic packet is received by any port of the plurality of ports. For example, following the packet having been output to network 110, if a loop exists in the network, the packet may be received by a port of switch 120; 314 continues until a determination is made in the affirmative, in which case process 200 continues to 316. At 316, the control circuitry causes a diagnostic protocol to execute.

Figure 4:
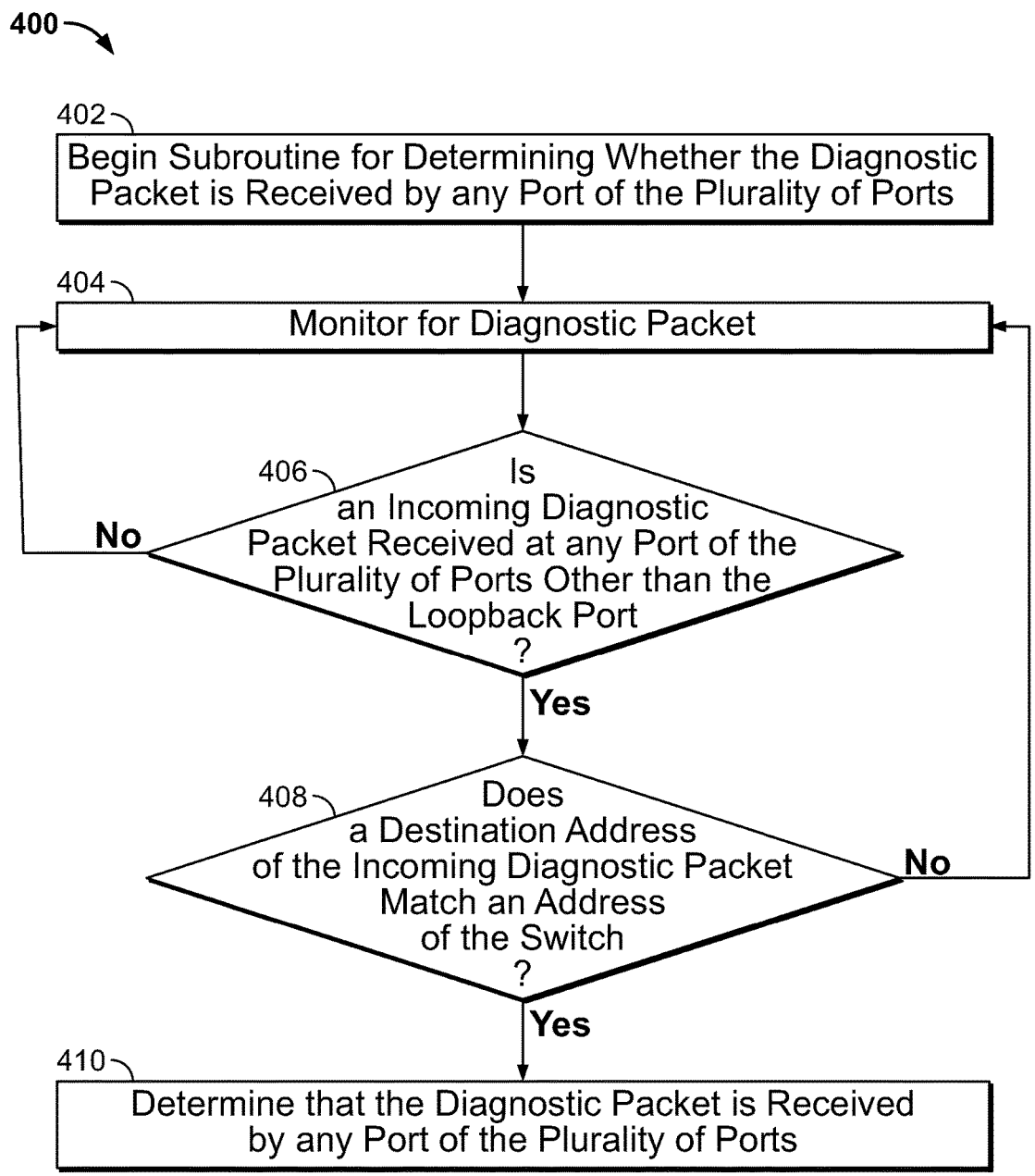
FIG. 4 depicts an illustrative flowchart of steps for determining whether a diagnostic packet is received by the switch (e.g., due to a network loop), in accordance with some embodiments of the disclosure.

FIG. 4 depicts an illustrative flowchart of steps for determining whether a diagnostic packet is received by the switch (e.g., due to a network loop), in accordance with some embodiments of the disclosure. For brevity elements of process 400 that were described in detail with respect to FIG. 1 and FIG. 2 will not be repeated in the description of FIG. 4, but those above-described elements are intended to carry into their respective description of FIG. 4 below. Process 400 begins at 402, where control circuitry (e.g., control circuitry 126) begins a subroutine for determining whether the diagnostic packet is received by any port of the plurality of ports (e.g., ports 230). At 404, control circuitry (e.g., control circuitry 126) monitors for a diagnostic packet (e.g., diagnostic packet 250). At 406, the control circuitry (e.g., control circuitry 126) determines whether an incoming diagnostic packet (e.g., diagnostic packet 250) is received at any port of the plurality of ports (e.g., ports 230) other than the loopback port (e.g., loopback port 123). If the determination is in the negative, process 400 reverts to 404. If the determination is in the affirmative, process 400 goes to 408, where control circuitry 126 determines whether a destination address of the incoming diagnostic packet (e.g., diagnostic packet 250) matches an address of the switch (e.g., switch 120, switch 230). If the determination is in the negative, process 400 reverts to 404. If the determination is in the affirmative, process 400 goes to 410, where the control circuitry (e.g., control circuitry 126) determines that the diagnostic packet (e.g., diagnostic packet 250) is received by any port of the plurality of ports (e.g., ports 220).

Figure 5:
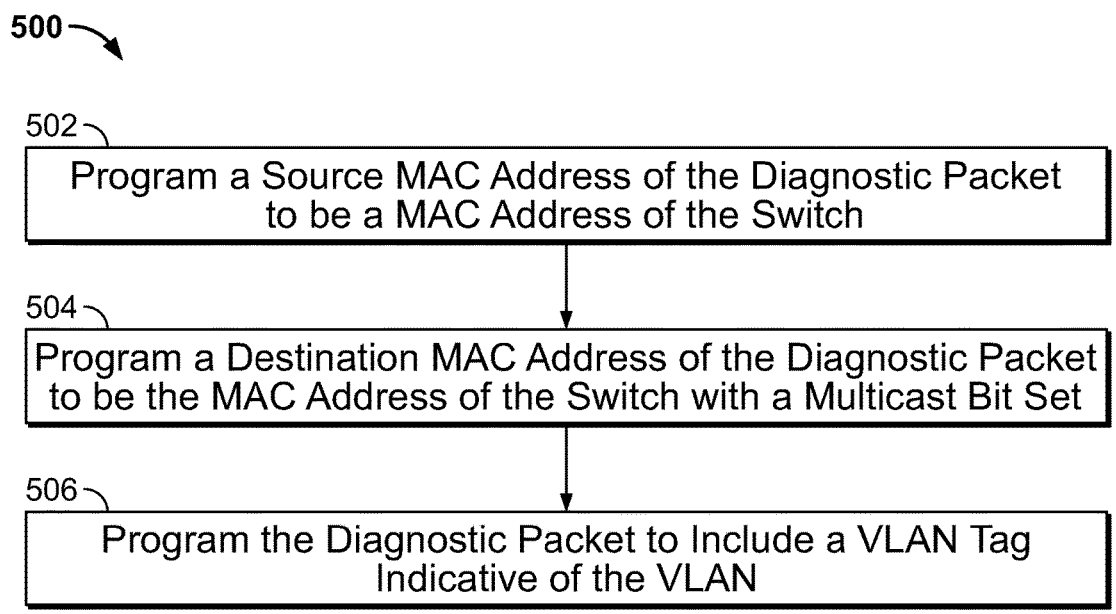
FIG. 5 depicts an illustrative flowchart of steps for programming a diagnostic packet, in accordance with some embodiments of the disclosure.

FIG. 5 depicts an illustrative flowchart of steps for programming a diagnostic packet, in accordance with some embodiments of the disclosure. For brevity elements of process 500 that were described in detail with respect to FIG. 1 and FIG. 2 will not be repeated in the description of FIG. 5, but those above-described elements are intended to carry into their respective description of FIG. 5 below.

Process 500 begins at 502, where control circuitry (e.g., control circuitry 126) programs a source MAC address of the diagnostic packet (e.g., diagnostic packet 250) to be a MAC address of the switch. At 504, control circuitry (e.g., control circuitry 126) programs a destination MAC address of the diagnostic packet (e.g., diagnostic packet 250) to be the MAC address of the switch (e.g., switch 120, switch 220) with a multicast bit set. At 506, the control circuitry (e.g., control circuitry 126) programs the diagnostic packet (e.g., diagnostic packet 250) to include a VLAN tag indicative of the VLAN.

Figure 6:
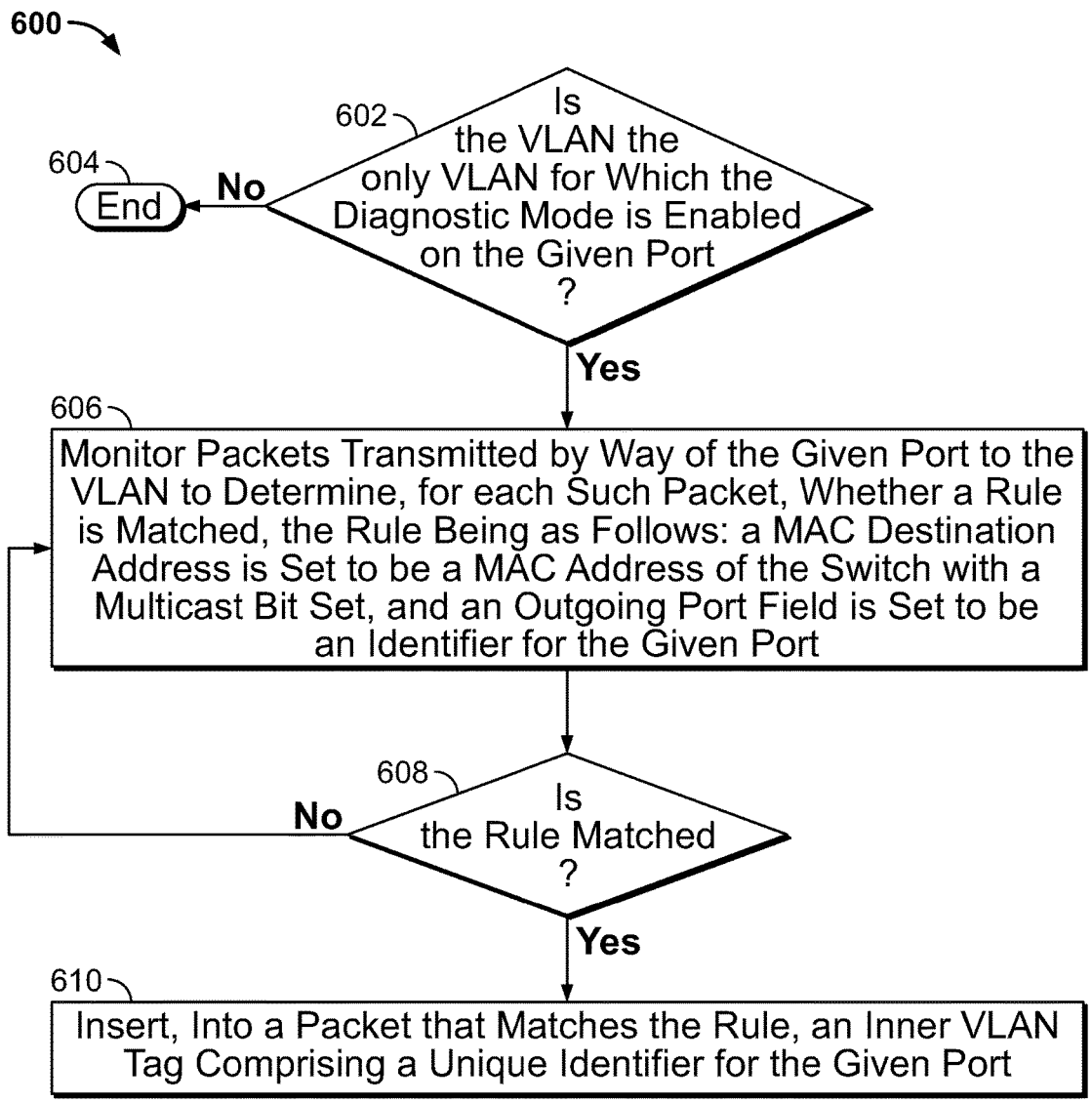
FIG. 6 depicts an illustrative flowchart of steps for determining whether to insert an inner VLAN tag into a packet, in accordance with some embodiments of the disclosure.

FIG. 6 depicts an illustrative flowchart of steps for determining whether to insert an inner VLAN tag into a packet, in accordance with some embodiments of the disclosure. For brevity elements of process 600 that were described in detail with respect to FIG. 1 and FIG. 2 will not be repeated in the description of FIG. 6, but those above-described elements are intended to carry into their respective description of FIG. 6 below.

Process 600 begins at 602, where control circuitry (e.g., control circuitry 126) determines whether the VLAN is the only VLAN for which the diagnostic mode is enabled on the given port. If the determination is in the negative, process 600 goes to 604, where process 600 ends. If the determination is in the affirmative, process 600 goes to 606, where control circuitry 126 monitors packets transmitted by way of the given port to the VLAN to determine, for each such packet, whether a rule is matched, the rule being as follows: a MAC destination address is set to be a MAC address of the switch with a multicast bit set, and an outgoing port field is set to be an identifier for the given port. At 608, the control circuitry (e.g., control circuitry 126) determines whether the rule is matched. If the determination is in the negative, process 600 reverts to 606. If the determination is in the affirmative, process 600 goes to 610, where the control circuitry (e.g., control circuitry 126) inserts, into a packet that matches the rule, an inner VLAN tag comprising a unique identifier for the given port.

The foregoing describes systems, methods, and apparatuses for configuring and implementing a system where anomaly detection (e.g., loop recovery protocol) is enabled through a hardware implementation. The present disclosure is not limited to a particular implementation. For example, one or more steps of the methods described above may be performed in a different order (or concurrently) and still achieve desirable results.

As referred herein, the term "in response to" refers to initiated as a result of. For example, a first action being performed in response to a second action may include interstitial steps between the first action and the second action.

What is claimed is:

1. A switch comprising:
a plurality of ports;
storage circuitry; and
control circuitry configured to:
  determine whether a diagnostic mode is enabled for a given port of the plurality of ports, the given port being part of a virtual local area network (VLAN);
  in response to determining that the diagnostic mode is enabled for the given port:
    designate a port of the plurality of ports as a loopback port, wherein a packet transmitted on the loopback port is forwarded according to an entry of a forwarding database stored at the storage circuitry;
    generate a layer 2 multicast index, stored at the storage circuitry, comprising an entry for the given port and an entry for the loopback port;

program the forwarding database with an entry for a destination address of the switch pointing to the layer 2 multicast index;

generate a diagnostic packet; and transmit the diagnostic packet on the loopback port;

determine whether the diagnostic packet is received by any port of the plurality of ports; and in response to determining that the diagnostic packet is received by any port of the plurality of ports, determine a network problem exists and cause a diagnostic protocol to execute.

2. The switch of claim 1, wherein the control circuitry is further configured, when determining whether the diagnostic packet is received by any port of the plurality of ports, to:

determine whether an incoming diagnostic packet is received at any port of the plurality of ports other than the loopback port;

in response to determining that the incoming diagnostic packet is received at any port of the plurality of ports other than the loopback port, determine whether a destination address of the incoming diagnostic packet matches an address of the switch; and in response to determining that the destination address of the incoming diagnostic packet matches the address of the switch, determine that the diagnostic packet is received by any port of the plurality of ports.

3. The switch of claim 1, wherein the control circuitry is further configured, when generating the diagnostic packet, to:

program a source media access control (MAC) address of the diagnostic packet to be a MAC address of the switch;

program a destination MAC address of the diagnostic packet to be the MAC address of the switch with a multicast bit set; and program the diagnostic packet to include a VLAN tag indicative of the VLAN.

4. The switch of claim 1, wherein the control circuitry is further configured to regulate traffic flow for packets with a destination address set to be a media access control (MAC) address of the switch.

5. The switch of claim 4, wherein the traffic flow is regulated by way of a meter whose rate is set to a range of 100-300 packets per second.

6. The switch of claim 1, wherein the diagnostic mode is specifically enabled on the given port for the VLAN, and wherein the control circuitry is further configured to:

determine whether the VLAN is the only VLAN for which the diagnostic mode is enabled on the given port;

in response to determining that the VLAN is the only VLAN for which the diagnostic mode is enabled on the given port, monitor packets transmitted by way of the given port to the VLAN to determine, for each such packet, whether a rule is matched, the rule being as follows:

a media access control (MAC) destination address is set to be a MAC address of the switch with a multicast bit set, and an outgoing port field is set to be an identifier for the given port; and in response to determining that the rule is matched, insert, into a packet that matches the rule, an inner VLAN tag comprising a unique identifier for the given port.

7. The switch of claim 6, wherein the control circuitry is further configured, in response to transmitting the diagnostic packet on the loopback port, to:

based on the entry of the forwarding database pointing to the layer 2 multicast index, replicate the diagnostic packet to both the given port and the loopback port, wherein the packet that matches the rule was replicated to the given port.

8. The switch of claim 1, wherein the control circuitry is further configured to:

determine whether the diagnostic mode is enabled on a port additional to the given port on the VLAN; and in response to determining that the diagnostic mode is enabled on the port additional to the given port on the VLAN, add the port additional to the given port to the layer 2 multicast index.

9. The switch of claim 1, wherein the control circuitry is further configured to:

determine whether the diagnostic mode has been disabled on all ports of the plurality of ports that are in the VLAN; and in response to determining that the diagnostic mode has been disabled on all ports of the plurality of ports that are in the VLAN, delete the layer 2 multicast index.

10. The switch of claim 9, wherein the diagnostic protocol being executed causes:

a determination that a loop exists in the VLAN; and a disabling of the loop by way of execution of a loop recovery action.

11. A method comprising:

determining whether a diagnostic mode is enabled for a given port of a plurality of ports of a switch, the given port being part of a virtual local area network (VLAN);

in response to determining that the diagnostic mode is enabled for the given port:

designating a port of the plurality of ports as a loopback port, wherein a packet transmitted on the loopback port is forwarded according to an entry of a forwarding database;

generating a layer 2 multicast index comprising an entry for the given port and an entry for the loopback port;

programming the forwarding database with an entry for a destination address of the switch pointing to the layer 2 multicast index;

generating a diagnostic packet; and transmitting the diagnostic packet on the loopback port;

determining whether the diagnostic packet is received by any port of the plurality of ports; and in response to determining that the diagnostic packet is received by any port of the plurality of ports, determining a network problem exists and causing a diagnostic protocol to execute.

12. The method of claim 11, wherein determining whether the diagnostic packet is received by any port of the plurality of ports comprises:

determining whether an incoming diagnostic packet is received at any port of the plurality of ports other than the loopback port;

in response to determining that the incoming diagnostic packet is received at any port of the plurality of ports other than the loopback port, determining whether a destination address of the incoming diagnostic packet matches an address of the switch; and in response to determining that the destination address of the incoming diagnostic packet matches the address of the switch, determining that the diagnostic packet is received by any port of the plurality of ports.

13. The method of claim 11, wherein generating the diagnostic packet comprises:

programming a source media access control (MAC) address of the diagnostic packet to be a MAC address of the switch;

programming a destination MAC address of the diagnostic packet to be the MAC address of the switch with a multicast bit set; and programming the diagnostic packet to include a VLAN tag indicative of the VLAN.

14. The method of claim 11, further comprising regulating traffic flow for packets with a destination address set to be a media access control (MAC) address of the switch.

15. The method of claim 14, wherein the traffic flow is regulated by way of a meter whose rate is set to a range of 100-300 packets per second.

16. The method of claim 11, wherein the diagnostic mode is specifically enabled on the given port for the VLAN, and wherein the method further comprises:

determining whether the VLAN is the only VLAN for which the diagnostic mode is enabled on the given port;

in response to determining that the VLAN is the only VLAN for which the diagnostic mode is enabled on the given port, monitoring packets transmitted by way of the given port to the VLAN to determine, for each such packet, whether a rule is matched, the rule being as follows:

a media access control (MAC) destination address is set to be a MAC address of the switch with a multicast bit set, and an outgoing port field is set to be an identifier for the given port; and in response to determining that the rule is matched, inserting, into a packet that matches the rule, an inner VLAN tag comprising a unique identifier for the given port.

17. The method of claim 16, further comprising, in response to transmitting the diagnostic packet on the loopback port:

based on the entry of the forwarding database pointing to the layer 2 multicast index, replicating the diagnostic packet to both the given port and the loopback port, wherein the packet that matches the rule was replicated to the given port.

18. The method of claim 11, further comprising:

determining whether the diagnostic mode is enabled on a port additional to the given port on the VLAN; and in response to determining that the diagnostic mode is enabled on the port additional to the given port on the VLAN, adding the port additional to the given port to the layer 2 multicast index.

19. The method of claim 11, further comprising:

determining whether the diagnostic mode has been disabled on all ports of the plurality of ports that are in the VLAN; and in response to determining that the diagnostic mode has been disabled on all ports of the plurality of ports that are in the VLAN, deleting the layer 2 multicast index.

20. The method of claim 19, wherein the diagnostic protocol being executed causes:

a determination that a loop exists in the VLAN; and a disabling of the loop by way of execution of a loop recovery action.

* * * * *